UNITED STATES PATENT OFFICE.

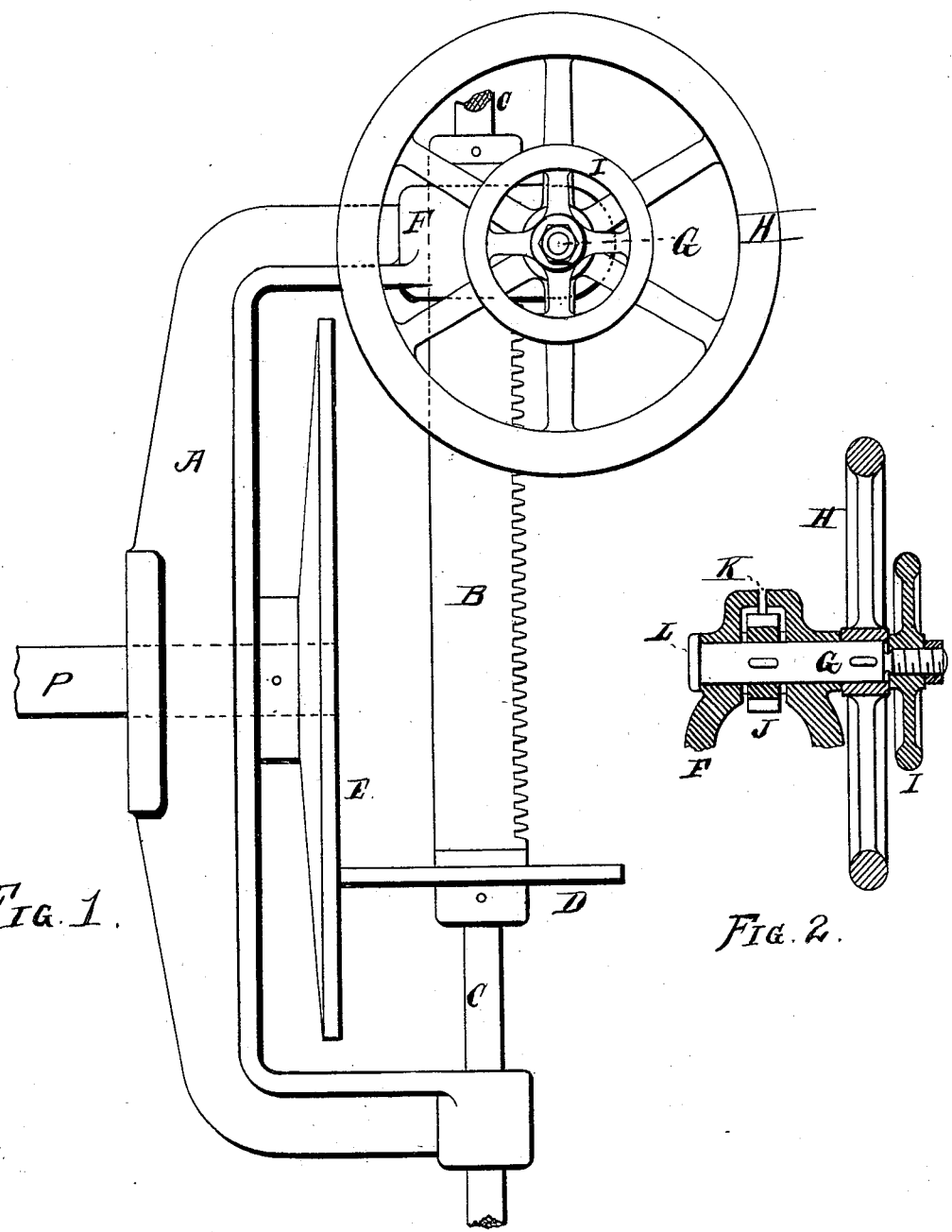

ALEXANDER GORDON, OF CINCINNATI, AND GEORGE T. REISS, OF HAMILTON, ASSIGNORS TO THE NILES TOOL WORKS, OF HAMILTON, OHIO.

ADJUSTING-GEARING.

SPECIFICATION forming part of Letters Patent No. 258,533, dated May 23, 1882.

Application filed April 8, 1882. (No model.)

*To all whom it may concern:*

Be it known that we, ALEXANDER GORDON, of Cincinnati, Hamilton county, Ohio, and GEO. T. REISS, of Hamilton, Butler county, Ohio, have invented certain new and useful Improvements in Adjusting-Gearing, of which the following is a specification, reference being had to the accompanying drawings, in which—

Figure 1 is a side view, and Fig. 2 a vertical section, of our device.

Our invention relates to devices for adjusting mechanism by means of a pinion gearing into a rack or gear, and relates to a means for locking the adjustment.

In the drawings we show our device as applied to a frictional feeding mechanism, such as is used on metal-drilling machines, &c.

A is a housing supporting a driven shaft, P, to which is fixed a disk, E, and a driving-shaft, C, to which is fixed a disk, D, whose edge, by frictional contact with the disk E, transmits rotary motion to the latter with a proportionate velocity dependent on distance from center of disk E to point of driving contact. The adjustment of this distance, by raising or lowering disk D, alters the velocity of rotation of the driven disk, and if the adjustment is carried above the center of the disk E the direction of motion of the disk E will be reversed.

B is a sleeve in which the shaft C revolves. It slides through the bearing F of housing A, and moves the shaft C and disk D with it. The sleeve B is toothed, as shown, forming a rack, into which gears a pinion, J, on a shaft, G, having a hand-wheel, H, by which it is rotated and the sleeve adjusted. The shaft G has a collar, L, forming a shoulder to fit against the outside of its bearing. The hand-wheel H fits against the other side of the bearing, and is fitted to slide on the shaft.

I is a hand-wheel screwed on the shaft G and bearing against the hub of the hand-wheel H, as shown. After adjusting, the hand-wheel I, which is simply a hand-nut, is screwed up firmly, thus pinching the bearing of the shaft G between the hub of the wheel H and the collar L, and causing a friction which will maintain the parts in position. In such use as this the pinion J may be fastened to the shaft and its hub may take the place of the collar L, and thus form one of the pinching-shoulders. It may be desirable not only to lock the pinion against rotation, but also to lock the rack against lost motion in the teeth. The bearing F, in which the sleeve B slides, is split at K, and the pinching of the entire bearing of the shaft G will cause the bearing F to clasp and pinch the sleeve slightly, thus locking it firmly.

It is obvious that the part F may be formed to clasp the edge of a spur-gear engaging with the pinion as well as a rack, and that other devices may take the place of hand-wheel H.

We claim as our invention—

1. The combination, with a rack or gear to be moved by a pinion, of a pinion, a collared pinion-shaft, a divided pinion-shaft bearing adapted to clamp the rack or gear, a handle fitted to slide on the pinion-shaft, and a nut screwing on the pinion-shaft to cause said divided bearing and rack or gear to be pinched between said handle and the collar portion of said shaft, substantially as and for the purpose set forth.

2. The combination, with a rack or gear to be moved by a pinion, of a pinion, a collared pinion-shaft, pinion-shaft bearing, a handle fitted to slide on the pinion-shaft, and a nut screwing on the pinion-shaft, whereby friction is created at the ends of the bearing, and the shaft thus locked against rotation, substantially as and for the purpose set forth.

ALEXANDER GORDON.
GEORGE T. REISS.

Witnesses:
JOHN LORENZ,
J. W. SEE.